United States Patent
Kommula et al.

(10) Patent No.: US 11,102,142 B2
(45) Date of Patent: Aug. 24, 2021

(54) METHODS AND APPARATUS TO PERFORM DYNAMIC LOAD BALANCING FOR A MULTI-FABRIC ENVIRONMENT IN NETWORK-BASED COMPUTING

(71) Applicant: VMware, Inc., Palo Alto, CA (US)

(72) Inventors: Raja Kommula, Cupertino, CA (US); Raj Yavatkar, Saratoga, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 299 days.

(21) Appl. No.: 15/879,148

(22) Filed: Jan. 24, 2018

(65) Prior Publication Data
US 2019/0230043 A1 Jul. 25, 2019

(51) Int. Cl.
| | | |
|---|---|---|
| *G06F 15/173* | (2006.01) | |
| *H04L 12/911* | (2013.01) | |
| *H04L 12/927* | (2013.01) | |
| *H04L 12/803* | (2013.01) | |

(52) U.S. Cl.
CPC .......... *H04L 47/726* (2013.01); *H04L 47/781* (2013.01); *H04L 47/803* (2013.01); *H04L 47/125* (2013.01); *H04L 47/826* (2013.01)

(58) Field of Classification Search
CPC . H04L 47/125; H04L 41/0896; H04L 41/147; H04L 43/0876; H04L 47/726; H04L 47/803; H04L 47/781
See application file for complete search history.

(56) References Cited

U.S. PATENT DOCUMENTS

| | | | |
|---|---|---|---|
| 8,510,409 B1 * | 8/2013 | Harris | H04L 69/162 709/217 |
| 9,432,254 B1 * | 8/2016 | Naqvi | H04L 41/084 |
| 2003/0112810 A1 | 6/2003 | Nakabayashi et al. | |
| 2004/0024906 A1 | 2/2004 | Valdevit et al. | |
| 2009/0046583 A1 * | 2/2009 | Towster | H04L 41/0896 370/232 |
| 2009/0073894 A1 | 3/2009 | Nimon et al. | |
| 2010/0008351 A1 | 1/2010 | Ashwood-Smith et al. | |
| 2012/0179922 A1 | 7/2012 | Mehrotra et al. | |
| 2014/0129714 A1 * | 5/2014 | Hamdi | H04L 47/82 709/226 |
| 2014/0313932 A1 | 10/2014 | Saltsidis | |
| 2014/0355477 A1 | 12/2014 | Velayudhan et al. | |
| 2015/0172210 A1 * | 6/2015 | Sarkar | H04L 67/10 709/226 |
| 2016/0197824 A1 | 7/2016 | Lin et al. | |
| 2016/0197853 A1 | 7/2016 | Kumar et al. | |
| 2016/0380899 A1 * | 12/2016 | Lee | H04L 41/0896 370/235 |
| 2017/0264490 A1 | 9/2017 | Kunda et al. | |
| 2018/0176036 A1 | 6/2018 | Butcher et al. | |
| 2018/0367981 A1 * | 12/2018 | Desai | H04W 8/082 |

* cited by examiner

*Primary Examiner* — Oleg Survillo
(74) *Attorney, Agent, or Firm* — Hanley, Flight & Zimmerman, LLC

(57) ABSTRACT

An example apparatus to manage network resources includes a load balancing detector to determine to reassign first and second network fabrics; and a network fabric configurator to, in response to the detecting to reassign the first and second network fabrics, configuring a virtual network distributed switch to: assign the first network fabric to ones of the first applications previously assigned to the second network fabric; and assign the second network fabric to the second application.

28 Claims, 11 Drawing Sheets

METHODS AND APPARATUS TO PERFORM DYNAMIC LOAD BALANCING FOR A MULTI-FABRIC ENVIRONMENT IN NETWORK-BASED COMPUTING

FIELD OF THE DISCLOSURE

The present disclosure relates generally to network-based computing and, more particularly, to methods and apparatus to perform dynamic load balancing for a multi-fabric environment in network-based computing.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

Figure 1A:
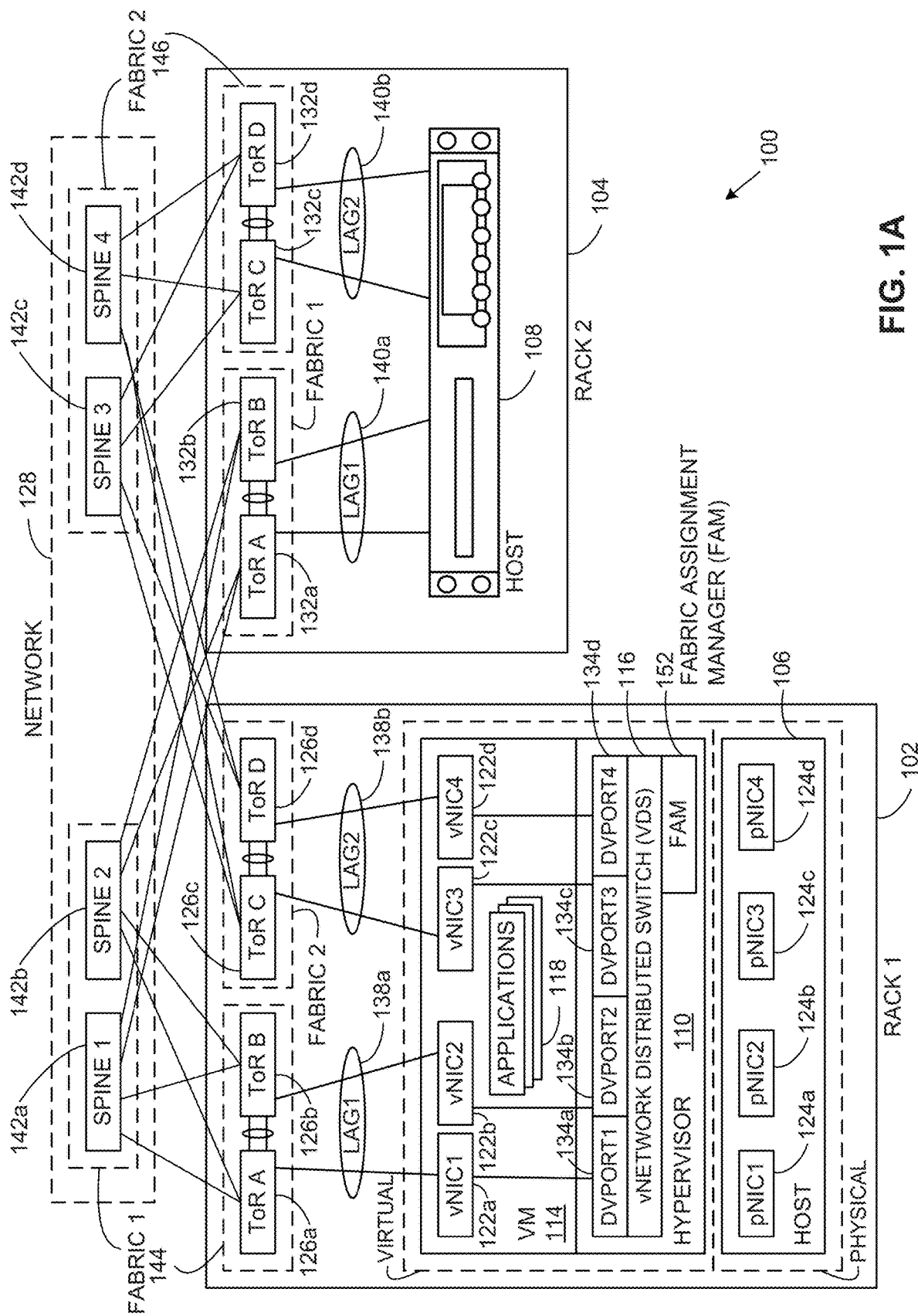
FIG. 1A is a block diagram of an example multi-rack system connected via a multi-fabric network for use in a software defined data center (SDDC).

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Examples disclosed herein perform dynamic load balancing for a multi-fabric environment in network-based computing. For example, a first host server may be connected to one or more other second host servers via two network fabrics. Examples disclosed herein allow both network fabrics to be assignable to any application of the first host server for network traffic while a critical application with a high-bandwidth need is not detected. However, in response to detecting such a critical application, examples disclosed herein reassign the first network fabric to the non-critical applications that were previously assigned the second network fabric, and assign the second network fabric for exclusive use by the detected critical application. In this manner, the critical application can exclusively use the second network fabric to serve its high-bandwidth need while the non-critical applications can continue their network traffic on the first network fabric. When the high-bandwidth need of the critical application no longer exists, examples disclosed herein may reassign ones of the non-critical applications to the second network fabric so that the non-critical network load of the non-critical applications is balanced across both of the first and second network fabrics. In this manner, by load balancing network traffic of applications across multiple network fabrics, examples disclosed herein enable more effective use of such multiple network fabrics than prior techniques of using multi-fabric environments.

Some datacenters are equipped with hosts having up to four 10/25 gigabits per second (Gbps) physical network interface cards (pNICs) for high-availability purposes. These pNICs are usually connected to two top-of-rack (ToR) switches and to two leaf switches in a leaf-spine fabric using a link aggregation group (LAG). Having a LAG from the host to the leaf switches via the two ToR switches aggregates the total available bandwidth to that LAG. For example, if each pNIC has a bandwidth of 10 Gbps, with four pNICs from a host, an application running on that host can get an effective bandwidth of 40 Gbps by being assigned to communicate via the LAG. One drawback of this approach is, all applications running on the host will share the total available bandwidth of the LAG. As such, if a critical application requires more bandwidth, the network cannot honor its requirement because every application is treated the same way in that all applications are given the same accessibility to the LAG without preferential treatment. Another drawback is associated with cost. If a ToR switch with a large port count is provided per rack to accommodate more network connections in that rack, the cost of providing such high-port-count switches increases the cost of each rack significantly. For example, to provide network connectivity in a rack with 32 hosts and four pNICs per host, a 96-port switch may be used to configure network connectivity for the 32 hosts. These high-port-count switches require multiple networking chips (e.g., application specific integrated circuits (ASICs)), which increases switch cost significantly relative to low-port count switches (e.g., switches with substantially fewer than 96 ports), which can be manufactured with a single ASIC. In addition to the manufacturing costs associated with providing multiple ASICs in a single switch, operating costs also increase because having such multiple ASICs per switch requires additional cooling, power, and internal cabling.

Examples disclosed herein overcome drawbacks associated with prior uses of leaf-spine network fabric configurations by creating a multi-fabric leaf-spine network configuration to serve the network needs of a physical rack of hosts, allowing any application to use any available network fabric while a critical application having a high-bandwidth need is not detected. Upon detection of such a critical application, examples disclosed herein include freeing or releasing one of the network fabrics from non-critical applications and exclusively assigning that network fabric to the critical application to serve its high-bandwidth needs.

Network-based computing such as cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Examples disclosed herein employ such monitoring of virtual and physical infrastructures to create and manage network configurations based on load balancing groups of aggregated network links (e.g., LAGs) connected between spine switches, ToR switches (e.g., leaf switches), and distributed virtual ports (dvports) of virtual distributed network switches. In examples disclosed herein, such groups of aggregated network links are formed using a LAG method for aggregating physical network interface cards (pNICs) into LAGs. Examples disclosed herein use multi-fabric load balancing in connection with LAGs to increase availability and throughput of network resources for critical applications and overcome problems associated with prior network fabric uses that treat network traffic of all applications in the same manner in terms of giving all applications equal use of a network fabric regardless of critical high-bandwidth needs.

LAG methods bundle multiple pNICs together into a LAG. A dvport can be bound to the LAG (and, thus, to multiple pNICs), and it is presented as a single virtual network interface card (vNIC) available for use by applications executing in a VM. In such LAG methods, different pNICs of a LAG can be connected to separate physical ToR switches, and doing so enables creating high-available networks with redundant paths between any two hosts. Since multiple pNICs can be bundled together using LAG, a single dvport can achieve an effective throughput of all the pNICs' maximum capacities combined. Thus, a physical host server having four 10 Gbps pNICs can provide a single dvport with a maximum possible throughput of 40 Gbps bandwidth, if needed.

As defined herein, a "critical application" is an application that has a current or imminent need for high-bandwidth use to serve its network traffic. Examples of critical applications include virtualized storage area network (VSAN) rebalancing, user-triggered VM migration between hosts, dynamic resource schedule (DRS)-triggered VM migration between hosts, host evacuations, host upgrades, etc. In some examples, this high-bandwidth need cannot be effectively served in an optimal manner if a critical application and non-critical applications share a LAG. In some examples, the high-bandwidth need of the critical application is a time-limited need such that after expiration of an associated duration of the high-bandwidth need, the critical application becomes a non-critical application. As defined herein, a "non-critical application" is an application having a substantially lower bandwidth need than a critical application. In some examples, such substantially lower bandwidth need can be satisfactorily served even when multiple non-critical applications share a LAG for their network traffic.

FIG. 1A is an example multi-rack system 100 connected via a multi-fabric network for use in a SDDC. The example multi-rack system 100 includes a first physical rack 102 and a second physical rack 104. The example physical racks 102, 104 include corresponding host servers 106, 108 (e.g., a first physical host server 106 and a second physical host server 108). The example first physical host server 106 of the first physical rack 102 is shown in detail. Although similar details are not shown for the second physical host server 108, the second physical host server 108 of the second physical rack 104 is substantially similar to the first physical host server 106. As used herein, the term "host" refers to a functionally indivisible unit of the physical hardware resources (e.g., the example physical hardware resources 224, 226 of FIG. 2), such as a physical server that is configured or allocated, as a whole, to a virtual rack and/or workload; powered on or off in its entirety; or may otherwise be considered a complete functional unit.

In the illustrated example of FIG. 1A, the host 106 executes an example hypervisor 110, which provides local virtualization services to create an example virtual environment in the host 106. The example hypervisor 110 may be implemented using any suitable hypervisor (e.g., VMWARE® ESX® hypervisor, Microsoft HYPER-V® hypervisor, and Kernel Based Virtual Machine (KVM)). In the illustrated example of FIG. 1A, the hypervisor 110 executes one or more VMs (e.g., an example VM 114) and an example virtual network (vnetwork) distributed switch (VDS) 116. The example VDS 116 functions as a single virtual switch that can be deployed in a single host and/or across multiple hosts. This enables setting network configurations that span across all the member hosts, and allows VMs to maintain consistent network configurations as they migrate across the multiple hosts. The example VM 114 of the illustrated example is configured to include multiple vNICs 122a-d for use by applications 118 executed by the VM 114 to perform network communications via a network. The example vNICs 122a-d are created by running virtualization services for physical network interface cards (pNICs) 124a-d of the host 106 of the first physical rack 102.

The example first physical rack 102 includes first and second ToR switches 126a,b (e.g., first and second leaf switches 126a,b) that connect via an example network 128 to first and second ToR switches 132a,b (e.g., first and second leaf switches 132a,b) of the second physical rack 104. In addition, the example first physical rack 102 includes third and fourth ToR switches 126c,d (e.g., first and second leaf switches 126c,d) that connect via the network 128 to third and fourth ToR switches 132c,d (e.g., third and fourth leaf switches 132c,d) of the second physical rack 104.

In the illustrated example, the VDS 116 provides dvports 134a-d assignable to the vNICs 122 a-d of the VM 114 to enable network communications between the applications 118 of the VM 114 and the ToR switches 126a-d. The dvports 134a-d of the illustrated example are assigned port numbers by the VDS 116 to identify a source/destination side of a connection that terminates at the hypervisor 110. The VDS 116 uses the port numbers of the dvports 134a-d to determine the vNICs 122 a-d and the applications 118 to which received network communications should be delivered.

In the illustrated example, the first physical rack 102 includes two separate LAGs indicated as example LAG1

138a and example LAG2 138b. The example LAG1 138a of the first physical rack 102 is a first aggregated group of the first and second vNICs 122a,b (implemented by the first and second pNICs 124a,b) that is connected between the host 106 and the first and second ToR switches 126a,b of the first physical rack 102. The example LAG2 138b of the first physical rack 102 is a second aggregated group of the third and fourth vNICs 122c,d (implemented by the third and fourth pNICs 124c,d) that is connected between the host 106 and the third and fourth ToR switches 126c,d of the first physical rack 102. In addition, the second physical rack 104 of the illustrated example includes two separate LAGs indicated as example LAG1 140a and example LAG2 140b that connect corresponding ones of the ToR switches 132a-d of the second physical rack 104 to the host 108 of the second physical rack 104.

In the illustrated example, the first and second ToR switches 126a,b of the first physical rack 102 are connected to the first and second ToR switches 132a,b of the second physical rack 104 via first and second spine switches 142a,b of the network 128. In addition, the example third and fourth ToR switches 126c,d of the first physical rack 102 are connected to the second and third ToR switches 132c,d of the second physical rack 104 via third and fourth spine switches 142c,d of the network 128. In the illustrated example, the first LAG 138a of the first physical rack 102, the first and second ToR switches 126a,b of the first physical rack 102, the first and second spine switches 142a,b, the first and second ToR switches 132a,b of the second physical rack 104, and the first LAG 140a of the second physical rack 104 form an example first network fabric 144. Also in the illustrated example, the second LAG 138b of the first physical rack 102, the third and fourth ToR switches 126c,d of the first physical rack 102, the third and fourth spine switches 142c,d, the third and fourth ToR switches 132c,d of the second physical rack 104, and the second LAG 140b of the second physical rack 104 form an example second network fabric 146.

In the illustrated example, configurations in the VDS 116 control assignments between the first and second network fabrics 144, 146 and the applications 118. For example, the first and second dvports 134a,b connect the first and second vNICs 122a,b to the first network fabric 144, and the third and fourth dvports 134c,d connect the third and fourth vNICs 122c,d to the second network fabric 146. As such, the VDS 116 can be configured to assign the first and second dvports 134a,b to applications 118 that are to be assigned the first network fabric 144. In addition, the VDS 116 can be configured to assign the third and fourth dvports 134c,d to applications 118 that are to be assigned the second network fabric 146.

Figure 3:
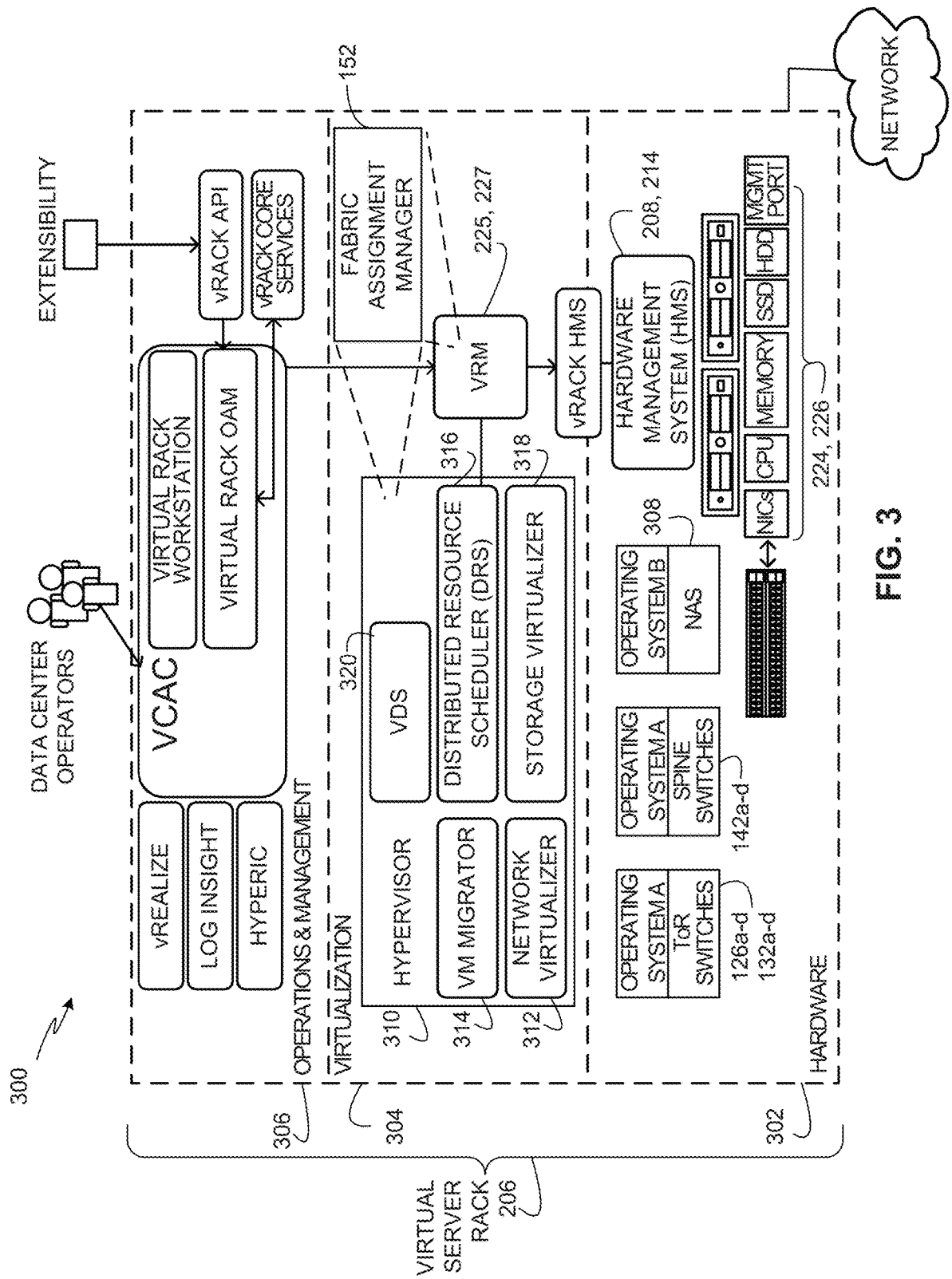
FIG. 3 depicts an example architecture to configure and deploy the example virtual server rack of FIG. 2 and to implement the multi-fabric network examples of FIGS. 1A-1C in accordance with teachings of this disclosure.

In the illustrated example, the hypervisor 110 is provided with a fabric assignment manager 152. The example fabric assignment manager 152 is provided to manage assignments of the first and second network fabrics 144, 146 to the applications 118 and to perform load balancing of the applications 118 between the first and second network fabrics 144, 146 based on the presence of critical applications needing high-bandwidth network usage. In some examples, the fabric assignment manager 152 is implemented by the VDS 116. In other examples, the fabric assignment manager 152 is implemented separate from the VDS 116 in the hypervisor 110. For example, as shown in FIG. 3 described below, the fabric assignment manager 152 could alternatively be implemented in an example virtual rack manager (VRM) 225, 227 (e.g., a software defined data center (SDDC) manager). In some examples, the fabric assignment manager 152 is implemented in both the VDS 116 and the VRM 225, 227. For example, separate instances of the fabric assignment manager 152 may be implemented in both the VDS 116 and the VRM 225, 227 for redundancy and/or different aspects of the fabric assignment manager 152 may be implemented across the VDS 116 and the VRM 225, 227. The example fabric assignment manager 152 is described in more detail below in connection with FIG. 4.

In the illustrated example of FIG. 1A, the fabric assignment manager 152 monitors the VM 114 (and any other VM running on the hypervisor 110) to determine whether there are any critical applications of the applications 118 requiring load balancing. In some examples, the fabric assignment manager 152 receives API calls from the VM 114 indicative of the presence of such critical applications requesting exclusive use of a network fabric to serve high-bandwidth needs for network traffic. In some examples, the fabric assignment manager 152 sends probe messages using telematics to the VM 114 to check for the presence of any critical applications. Upon determining that a critical application exists, the fabric assignment manager 152 performs load balancing operations as described below in connection with FIGS. 1B and 1C to grant exclusive use of one of the network fabrics 144, 146 to the critical application.

Figure 1B:
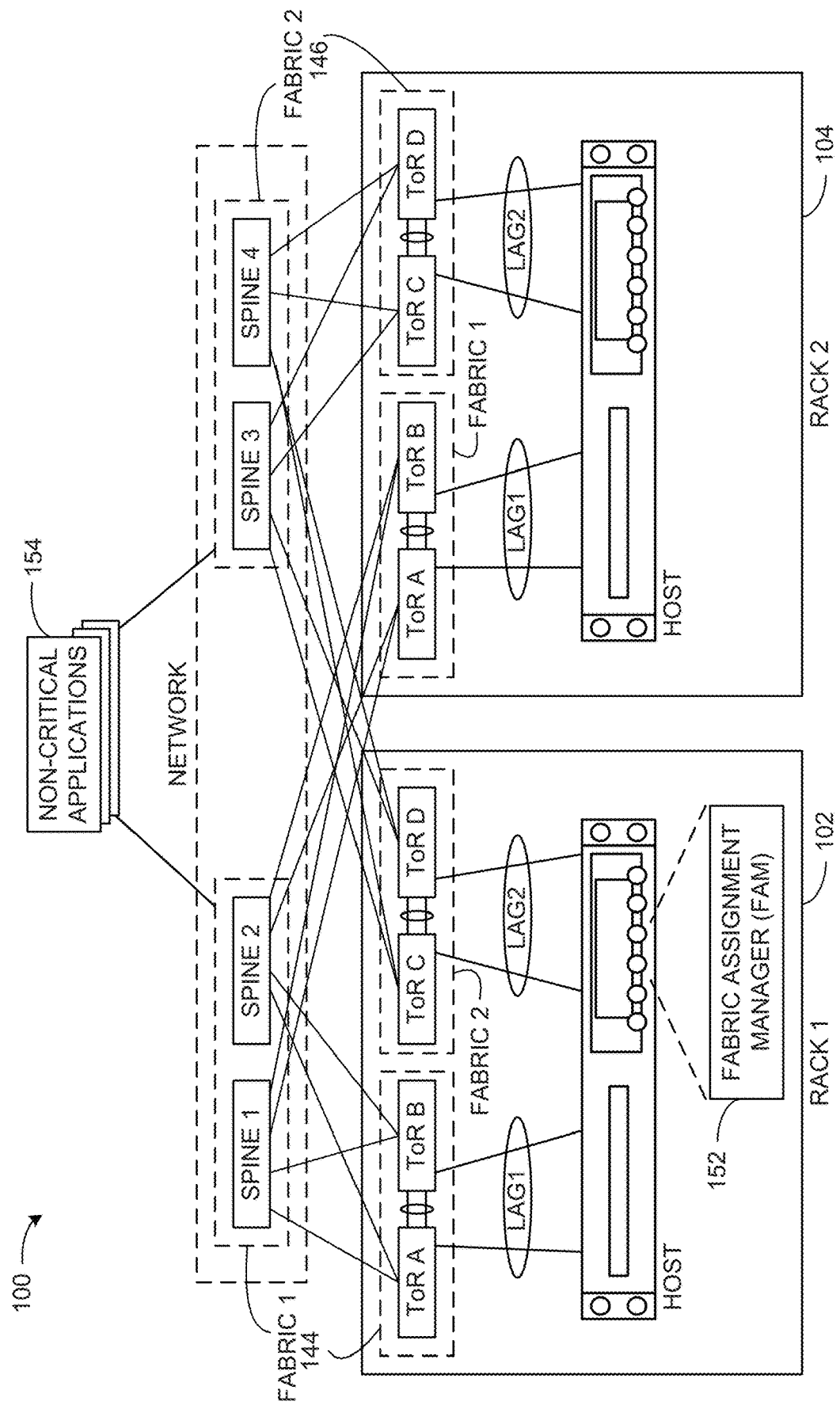
FIG. 1B is a block diagram of the example multi-rack system of FIG. 1A in which the fabric assignment manager of FIG. 1A assigns the first and second network fabrics of the multi-fabric network of FIG. 1A to first applications.
Figure 1C:
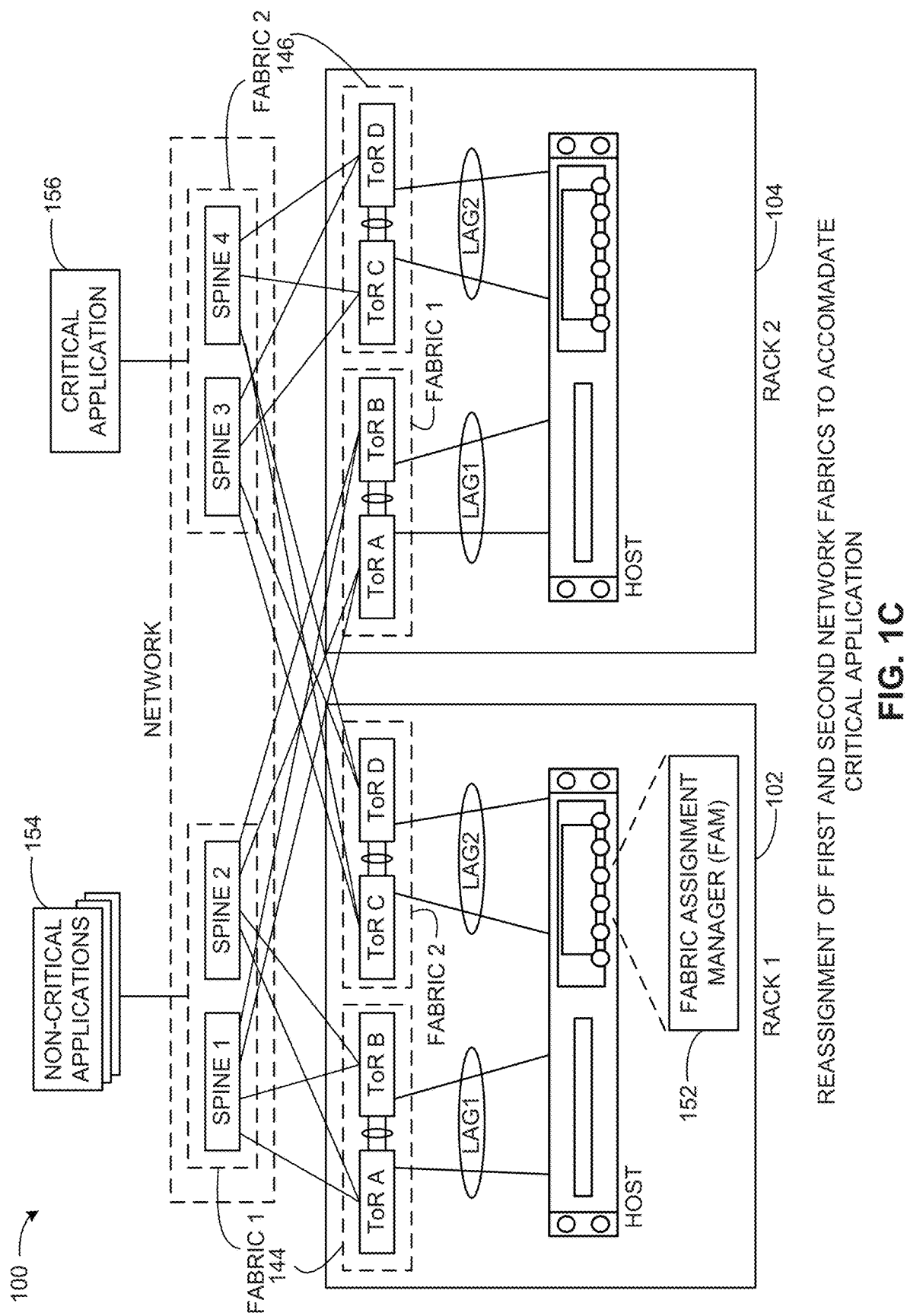
FIG. 1C is a block diagram of the example multi-rack system of FIG. 1A and FIG. 1B in which the fabric assignment manager of FIGS. 1A and 1B performs dynamic multi-fabric load balancing by reassign the first and second network fabrics between the first applications and a second application.

FIG. 1B is the example multi-rack system 100 of FIG. 1A in which the fabric assignment manager 152 assigns the first and second network fabrics 144, 146 to first applications (e.g., of the applications 118 of FIG. 1A) that are non-critical applications 154 when the fabric assignment manager 152 does not detect any critical application (e.g., the critical application 156 of FIG. 1C). The example fabric assignment manager 152 assigns the first and second network fabrics 144, 146 by configuring the VDS 116 to assign ones of the dvports 134a-d to the non-critical applications 154 such that the non-critical applications 154 are assigned across both of the first and second network fabrics 144, 146 by virtue of corresponding dvports 134a-d corresponding to vNICs 122 a-d connected to corresponding ones of the first and second network fabrics 144, 146. In the illustrated example of FIG. 1B, the fabric assignment manager 152 does not reserve either of the network fabrics 144, 146 for exclusive use by any non-critical application 154.

Turning to FIG. 1C, the fabric assignment manager 152 performs dynamic multi-fabric load balancing when it detects the presence of a second application of the applications 118 that is a critical application 156 needing exclusive use of a network fabric for high-bandwidth network traffic. In the illustrated example of FIG. 1C, the fabric assignment manager 152 releases the second network fabric 146 from any non-critical applications 154 of the applications 118 that were previously assigned to the second network fabric 146 by assigning the first network fabric 144 to those non-critical applications 154. The example fabric assignment manager 152 assigns the first network fabric 144 to the non-critical applications 154 by configuring the VDS 116 to assign the first and second dvports 134a,b (FIG. 1A) to the non-critical applications 154 such that the non-critical applications 154 are assigned to only the first network fabric 144 by virtue of first and second dvports 134a,b corresponding to the first and second vNICs 122a,b connected to the first network fabric 144. When the second network fabric 146 is freed, the example fabric assignment manager 152 assigns the second network fabric 146 to the critical application 156 of the applications 118 for exclusive use by the critical application 156. The example fabric assignment manager 152 assigns the second network fabric 146 to the critical application 156 by configuring the VDS 116 to assign the third and fourth dvports 134*c,d* to the critical application 156 such that the second network fabric 146 is assigned exclusively to the critical application 156 by virtue of third and fourth dvports 134*c,d* corresponding to the third and fourth vNICs 122*c,d* connected to the second network fabric 146. In the illustrated example, the high-bandwidth need of the critical application 156 is a time-limited need such that after expiration of an associated duration of the high-bandwidth need, the critical application 156 becomes a non-critical application 154. When the critical application 156 becomes a non-critical application 154, the fabric assignment manager 152 makes both of the first and second network fabrics 144, 146 assignable to any non-critical application 154. In this manner, the fabric assignment manager 152 can again assign the non-critical applications 154 to both of the first and second network fabrics 144, 146.

Figure 2:
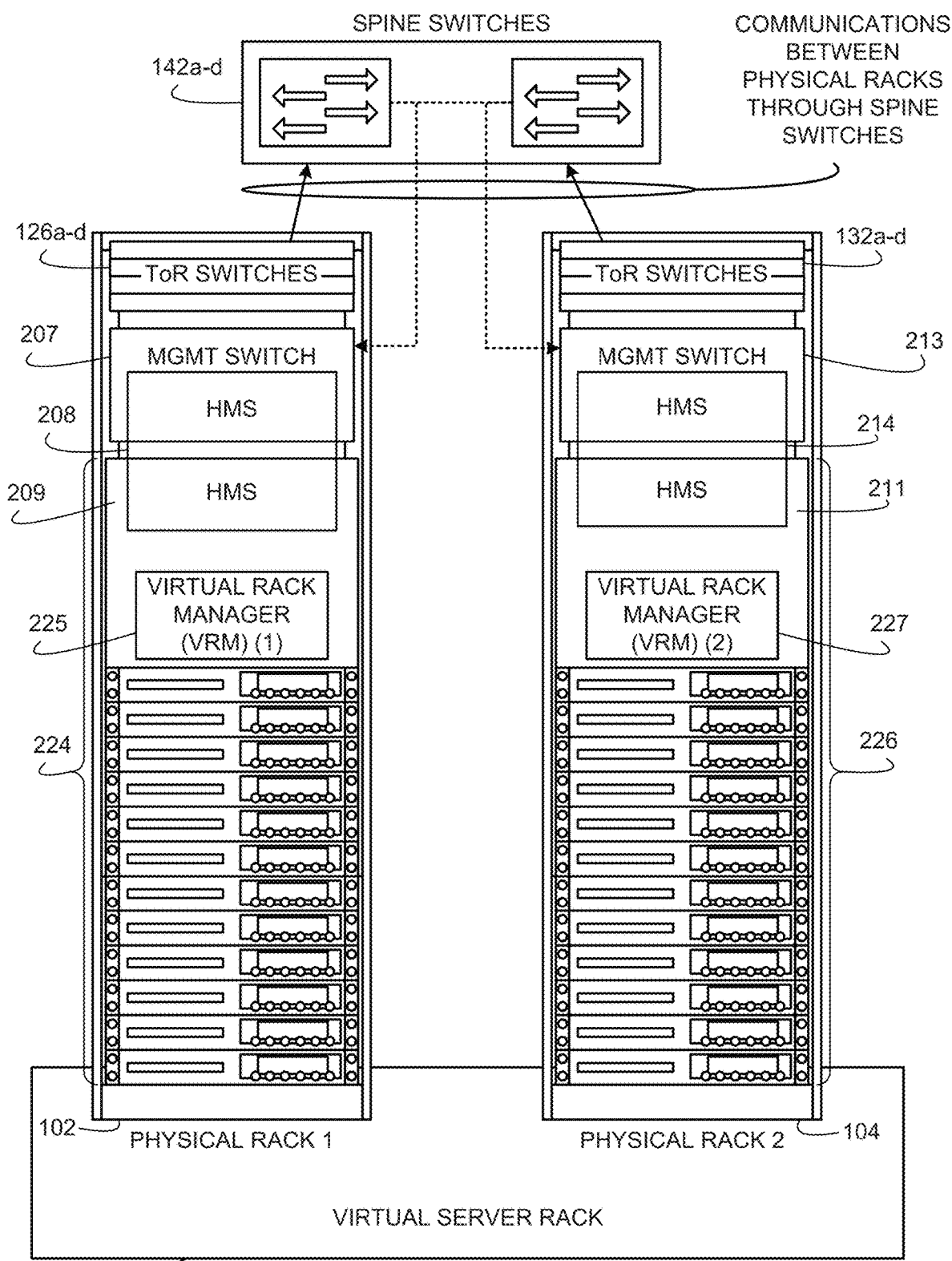
FIG. 2 depicts the example physical racks of FIGS. 1A-1C in an example virtual server rack deployment in which the multi-fabric network examples of FIGS. 1A-1C may be implemented in accordance with teachings of this disclosure.

Examples disclosed herein may be employed with HCI-based SDDCs deployed using virtual server rack systems such as the virtual server rack 206 of FIG. 2. A virtual server rack system can be managed using a set of tools that is accessible to all components of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include ToR switches (e.g., leaf switches) (e.g., the ToR switches 126*a-d* and 132*a-d* of FIG. 1A) and spine switches (e.g., the spine switches 142*a-d* of FIG. 1A) connected using a leaf-spine architecture. A virtual server rack system also includes software-defined data storage (e.g., storage area network (SAN), VWWARE® VIRTUAL SAN™) distributed across multiple hosts for redundancy and virtualized networking software (e.g., VMWARE NSX™)

FIG. 2 depicts the example physical racks 102, 104 of FIG. 1A in an example deployment of a virtual server rack 206 in which the multi-fabric load balancing described above in connection with FIGS. 1A-1C may be implemented. The virtual server rack 206 of the illustrated example enables representing hardware resources (e.g., physical hardware resources 224, 226) as logical/virtual resources. In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more VMWARE ESXI™ clusters along with a logical storage pool and network connectivity. In examples disclosed herein, a cluster is a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 includes the example ToR switches 126*a-d* of FIG. 1A, an example management switch 207, and an example server host node(0) 209. In the illustrated example, the management switch 207 and the server host node(0) 209 run a hardware management system (HMS) 208 for the first physical rack 102. The second physical rack 104 of the illustrated example is also provided with the example ToR switches 132*a-d* of FIG. 1A, an example management switch 213, and an example server host node(0) 211. In the illustrated example, the management switch 213 and the server host node (0) 211 run an HMS 214 for the second physical rack 104.

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 126*a-d*, 132*a-d*, and also connects to spine switch management ports of the spine switches 142*a-d*. In the illustrated example, the ToR switches 126*a-d*, 132*a-d* implement leaf switches such that the ToR switches 126*a-d*, 132*a-d*, and the spine switches 142*a-d* are in communication with one another in a leaf-spine switch configuration. These example connections form a non-routable private Internet protocol (IP) management network for out-of-band (OOB) management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 126*a-d*, 132*a-d* and to the spine switch management ports of the spine switches 142*a-d* for switch management. In examples disclosed herein, the ToR switches 126*a-d*, 132*a-d* connect to pNICs (e.g., using 10 Gbps links) of server hosts in the physical racks 102, 104 for downlink communications. For example, the ToR switches 126*a-d* connect to the pNICs 124*a-d* via the vNICs 122 *a-d* as shown in FIG. 1A. The example ToR switches 126*a-d*, 132*a-d* also connect to the spine switch(es) 142*a-d* (e.g., using 40 Gbps links) for uplink communications. In the illustrated example, the management switch 207, 213 is also connected to the ToR switches 126*a-d*, 132*a-d* (e.g., using a 10 Gbps link) for internal communications between the management switch 207, 213 and the ToR switches 126*a-d*, 132*a-d*. Also in the illustrated example, the HMS 208, 214 is provided with in-band (IB) connectivity to individual server nodes (e.g., server nodes in example physical hardware resources 224, 226) of the physical rack 102, 104. In the illustrated example, the IB connection interfaces to physical hardware resources 224, 226 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 208, 214 include discovery of new hardware, bootstrapping, remote power control, authentication, hard resetting of non-responsive hosts, monitoring catastrophic hardware failures, and firmware upgrades. The example HMS 208, 214 uses IB management to periodically monitor status and health of the physical resources 224, 226 and to keep server objects and switch objects up to date. Example IB operations performed by the HMS 208, 214 include controlling power state, accessing temperature sensors, controlling Basic Input/Output System (BIOS) inventory of hardware (e.g., central processing units (CPUs), memory, disks, etc.), event monitoring, and logging events.

The HMSs 208, 214 of the corresponding physical racks 102, 104 interface with VRMs 225, 227 (e.g., software defined data center managers) of the corresponding physical racks 102, 104 to instantiate and manage the virtual server rack 206 using physical hardware resources 224, 226 (e.g., processors, pNICs, servers, switches, storage devices, peripherals, power supplies, etc.) of the physical racks 102, 104. In the illustrated example, the VRM 225 of the first physical rack 102 runs on a cluster of three server host nodes of the first physical rack 102, one of which is the server host node(0) 209. In the illustrated example, the VRM 227 of the second physical rack 104 runs on a cluster of three server host nodes of the second physical rack 104, one of which is the server host node(0) 211. In the illustrated example, the VRMs 225, 227 of the corresponding physical racks 102, 104 communicate with each other through the spine switches 142a-d. Also in the illustrated example, communications between physical hardware resources 224, 226 of the physical racks 102, 104 are exchanged between the ToR switches 126a-d, 132a-d of the physical racks 102, 104 through the spine switches 142a-d. In other examples, fewer or more spine switches 142a-d may be used. For example, additional spine switches may be added when physical racks are added to the virtual server rack 206.

The VRM 225 of the first physical rack 102 runs on a cluster of three server host nodes of the first physical rack 102 using a high availability (HA) mode configuration. In addition, the VRM 227 of the second physical rack 104 runs on a cluster of three server host nodes of the second physical rack 104 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a CLI and APIs are used to manage the ToR switches 126a-d, 132a-d. For example, the HMS 208, 214 uses CLI/APIs to populate switch objects corresponding to the ToR switches 126a-d, 132a-d. On HMS bootup, the HMS 208, 214 populates initial switch objects with statically available information. In addition, the HMS 208, 214 uses a periodic polling mechanism as part of an HMS switch management application thread to collect statistical and health data from the ToR switches 126a-d, 132a-d (e.g., Link states, Packet Stats, Availability, etc.). There is also a configuration buffer as part of the switch object which stores the configuration information to be applied on the switch.

The HMS 208, 214 of the illustrated example of FIG. 2 is a stateless software agent responsible for managing individual hardware resources in a physical rack 102, 104. Examples of hardware elements that the HMS 208, 214 manages are servers and network switches in the physical rack 102, 104. In the illustrated example, the HMS 208, 214 is implemented using Java on Linux so that an OOB management portion of the HMS 208, 214 runs as a Java application on a white box management switch (e.g., the management switch 207, 213) in the physical rack 102, 104. However, any other programming language and any other OS may be used to implement the HMS 208, 214.

FIG. 3 depicts an example virtual server rack architecture 300 that may be used to configure and deploy the virtual server rack 206 of FIG. 2 and to implement the dynamic multi-fabric load balancing described above in connection with FIGS. 1A-1C. The example architecture 300 of FIG. 3 includes a hardware layer 302, a virtualization layer 304, and an operations and management (OAM) layer 306. In the illustrated example, the hardware layer 302, the virtualization layer 304, and the OAM layer 306 are part of the example virtual server rack 206 of FIG. 2. The virtual server rack 206 of the illustrated example is based on the physical racks 102, 104 of FIGS. 1A-1C and 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208, 214 of FIG. 2 that interfaces with the physical hardware resources 224, 226 (e.g., processors, pNICs, servers, switches, storage devices, peripherals, power supplies, etc.), the ToR switches 126a-d, 132a-d of FIGS. 1A and 2, the spine switches 142a-d of FIGS. 1A and 2, and network attached storage (NAS) hardware 308. The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level bootup sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 102, 104 including the dual-redundant management switches 207, 213 and dedicated management ports attached to the server host nodes(0) 209, 211 and the ToR switches 126a-d, 132a-d. In the illustrated example, one instance of the HMS 208, 214 runs per physical rack 102, 104. For example, the HMS 208, 214 may run on the management switch 207, 213 and the server host node(0) 209, 211 installed in the example physical rack 102 of FIGS. 1A-1C and 2. In the illustrated example of FIG. 2 both of the HMSs 208, 214 are provided in corresponding management switches 207, 213 and the corresponding server host nodes (0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 102, 104. In such examples, the physical rack 102, 104 is provided with two management switches, and each of the two management switches runs a separate instance of the HMS 208, 214. In such examples, the physical rack 102 of FIGS. 1A-1C and 2 runs two instances of the HMS 208 on two separate physical hardware management switches and two separate server host nodes(0), and the physical rack 104 of FIGS. 1A-1C and 2 runs two instances of the HMS 214 on two separate physical hardware management switches and two separate server host nodes(0). In this manner, for example, one of the instances of the HMS 208 on the physical rack 102 serves as the primary HMS 208 and the other instance of the HMS 208 serves as the secondary HMS 208. The two instances of the HMS 208 on two separate management switches and two separate server host nodes(0) in the physical rack 102 (or the two instances of the HMS 214 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 304 includes the VRM 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC lifecycle, and translates logical resource provisioning to allocation of physical hardware resources 224, 226. The example VRM 225, 227 interfaces with an example hypervisor 310 of the virtualization layer 304. The example hypervisor 310 is installed and runs on server hosts in the example physical resources 224, 226 to enable the server hosts to be partitioned into multiple logical servers to create VMs. For example, the hypervisor 310 of FIG. 3 may be used to implement the hypervisor 110 of FIG. 1A to create the VM 114 in a virtual environment. In some examples, the hypervisor 310 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example, the VRM 225, 227 and/or the hypervisor 310 may be used to implement a virtual cloud management system such as an SDDC manager for a SDDC platform. An example virtual cloud management system that may be used with examples disclosed herein is the VMware Cloud Foundation (VCF) platform developed and provided by VMware, Inc. The virtual cloud management system implemented by the VRM 225, 227 and/or the hypervisor 310 manages different parameters of the ToR switches 126a-d, 132a-d, the spine switches 142a-d, and the NAS 308. In some examples, the virtual cloud management system commands different components even when such components run different OSs.

In the illustrated example of FIG. 3, the hypervisor 310 is shown having a number of virtualization components executing thereon including an example network virtualizer 312, an example VM migrator 314, an example distributed resource scheduler (DRS) 316, an example storage virtualizer 318, and an example VDS 320. In the illustrated example, the VRM 225, 227 communicates with these components to manage and present the logical view of underlying resources such as hosts and clusters. The example VRM 225, 227 also uses the logical view for orchestration and provisioning of workloads.

The example network virtualizer 312 virtualizes network resources such as physical hardware switches (e.g., the management switches 207, 213 of FIG. 2, the ToR switches 126a-d, 132a-d, and/or the spine switches 142a-d) to provide software-based virtual networks. The example network virtualizer 312 enables treating physical network resources (e.g., switches) as a pool of transport capacity. In some examples, the network virtualizer 312 also provides network and security services to VMs with a policy driven approach.

The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using a VMWARE NSX™ network virtualization platform that includes a number of components including a VMWARE NSX™ network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid state drives (SSDs) to create a shared datastore for use as virtual storage resources in virtual environments. In some examples, the storage virtualizer 318 may be implemented using a VMWARE® VIRTUAL SAN™ network data storage virtualization component developed and provided by VMware, Inc.

Figure 5:
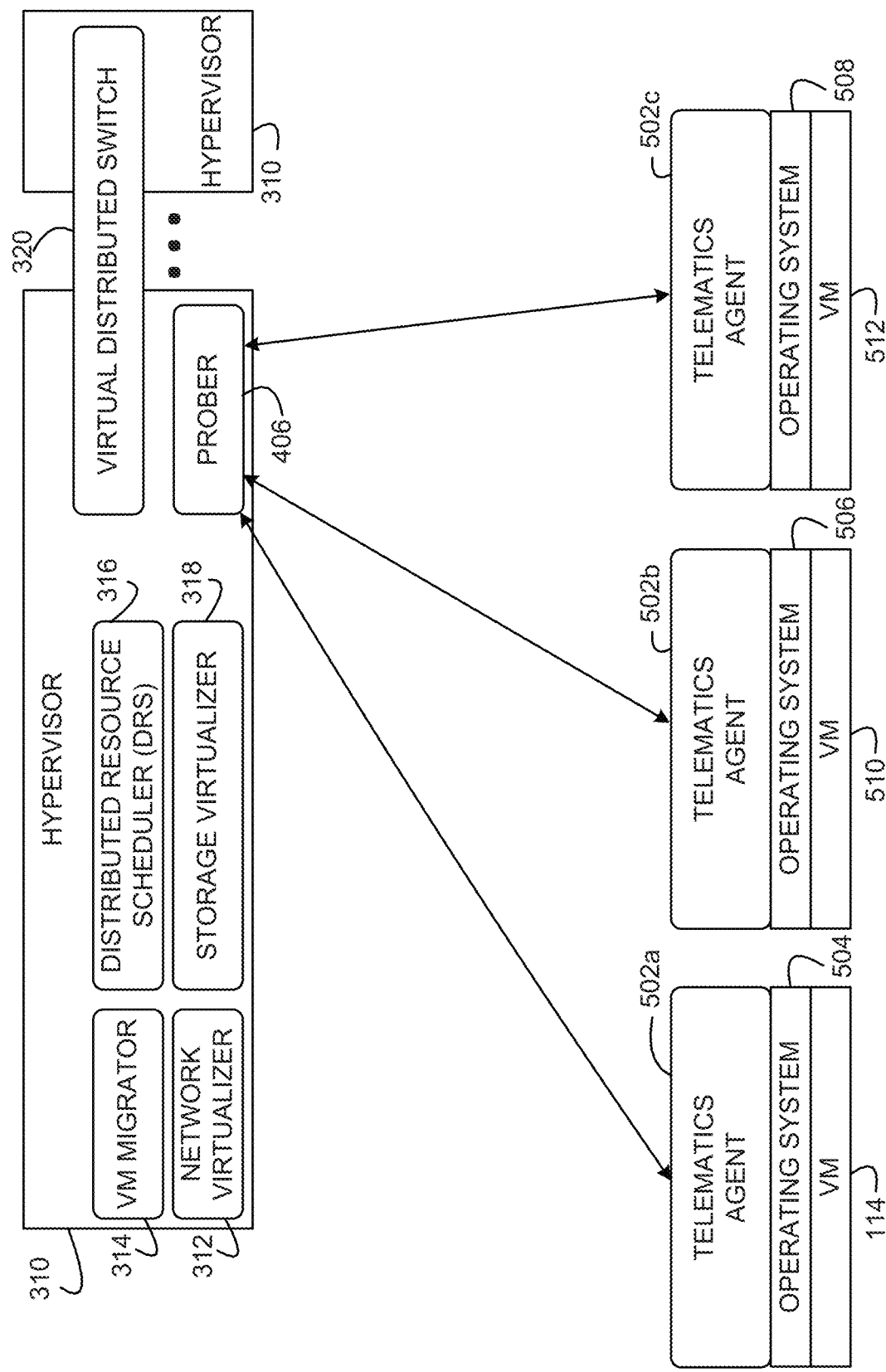
FIG. 5 is a block diagram of an example telematics implementation that may be used in the multi-rack system of FIGS. 1A-1C to determine when to reassign the first and second network fabrics of the multi-fabric network of FIGS. 1A-1C.

The example VDS 320 implements software-defined networks for use in connection with virtualized environments in the form of a networking module for the hypervisor 310. For example, the VDS 320 of FIG. 3 may be used to implement the VDS 116 of FIG. 1A. In the illustrated example, the VDS 320 and/or the VRM 225, 227 may be used to implement the example fabric assignment manager 152 of FIGS. 1A-1C. In some examples, the VDS 320 is distributed across multiple hosts and across separate hypervisors of those hosts (e.g., as shown in FIG. 5).

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMWARE VCLOUD® AUTOMATION CENTER™ (VCAC) that relies on the VCAC functionality and also leverages utilities such as VMWARE VCENTER™ Log Insight™, and VMWARE VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

Figure 4:
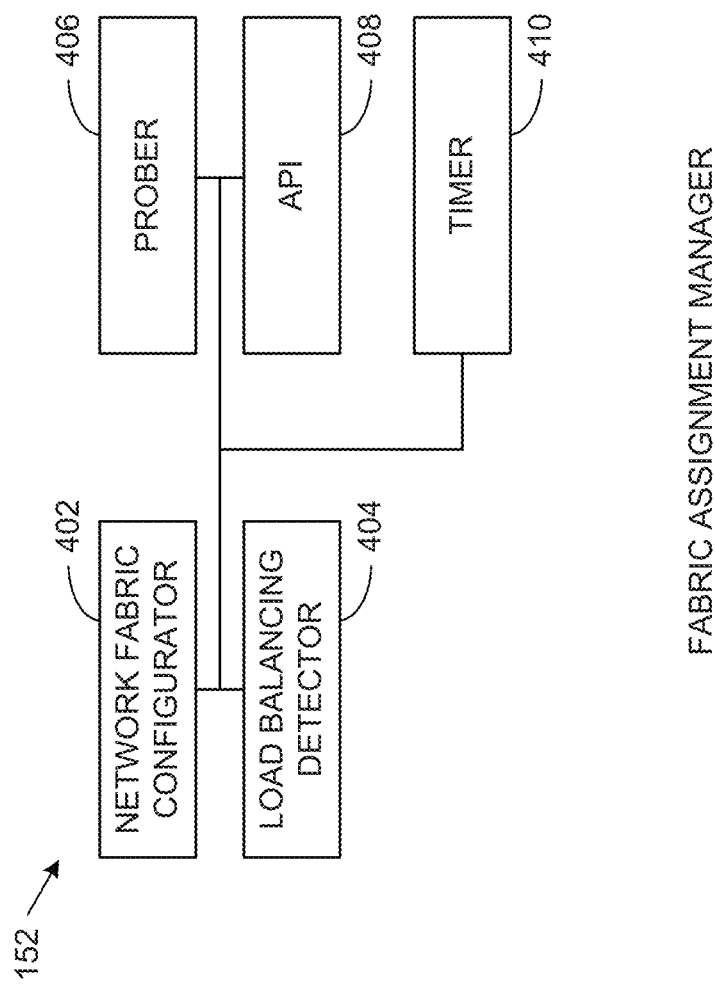
FIG. 4 depicts a block diagram of the example fabric assignment manager of FIGS. 1 and 3 that may be used to perform dynamic multi-fabric load balancing in the multi-fabric network of FIGS. 1A-1C.

FIG. 4 depicts a block diagram of the example fabric assignment manager 152 of FIGS. 1A-1C and 3 that may be used to implement dynamic multi-fabric load balancing in accordance with teachings of this disclosure. In some examples, the fabric assignment manager 152 is implemented by a virtual network distributed switch (e.g., the VDS 116 of FIG. 1A and/or the VDS 320 of FIG. 3). In other examples, the fabric assignment manager 152 is implemented by a virtual rack manager (e.g., the VRM 225, 227 of FIGS. 2 and 3). In yet other examples, the fabric assignment manager 152 is implemented by the hypervisor 110, 310 as a component separate from the VDS 116, 320 and the VRM 225, 227.

In the illustrated example of FIG. 4, the fabric assignment manager 152 is provided with an example network fabric configurator 402 to assign network fabrics to different applications. For example, the network fabric configurator 402 can configure the VDS 116 as described above in connection with FIG. 1A to assign the first and second network fabrics 144, 146 by assigning different ones of the dvports 134a-d to different applications 118. When a critical application 156 (FIG. 1C) is not detected, the example network fabric configurator 402 configures the VDS 116 to assign the first and second network fabrics 144, 146 to non-critical applications 154 (FIG. 1B). In addition, the network fabric configurator 402 performs dynamic multi-fabric load balancing when a critical application 156 (FIG. 1C) needing exclusive use of a network fabric for high-bandwidth network traffic is detected. For example, the network fabric configurator 402 configures the VDS 116 to release the second network fabric 146 from any non-critical applications 154 of the applications 118 that were previously assigned to the second network fabric 146 by assigning the first network fabric 144 to those non-critical applications 154, and configures the VDS 116 to assign the second network fabric 146 to the critical application 156 of the applications 118 for exclusive use by the critical application 156. When the critical application 156 becomes a non-critical application 154, the network fabric configurator 402 configures the VDS 116 to again assign the non-critical applications 154 to both of the first and second network fabrics 144, 146.

The example fabric assignment manager 152 is provided with an example load balancing detector 404 to detect the presence of a critical application 156 indicative that the load balancing detector 404 should signal the network fabric configurator 402 to perform dynamic multi-fabric load balancing to grant exclusive use of a network fabric to the critical application 156 as described above in connection with FIG. 1C. The example load balancing detector 404 also determines when the high-bandwidth need of the critical application 156 no longer exists such that the critical application 156 becomes a non-critical application 154. When the load balancing detector 404 determines that the critical application 156 no longer exists, the load balancing detector 404 signals the network fabric configurator 402 to perform dynamic multi-fabric load balancing by rebalancing network loads from the non-critical applications 154 across both of the first and second network fabrics 144,146 (FIGS. 1A-1C).

In the illustrated example, the load balancing detector 404 may determine the need for dynamic multi-fabric load balancing based on multi-fabric load balancing events. To generate such multi-fabric load balancing events, the fabric assignment manager 152 is provided with an example prober 406 and/or an example application programming interface (API) 408. In some examples, the fabric assignment manager 152 is provided with both of the example prober 406 and the example API 408. In other examples, the fabric assignment manager 152 is provided with only one of the example prober 406 or the example API 408.

The example prober 406 generates multi-fabric load balancing events based on using telematics to detect the existence of critical applications 156. For example, the prober 406 may send probe messages to VMs (e.g., the VM 114 of FIG. 1A) for querying the status of the VMs to determine whether there are any critical applications 156 executing therein having imminent high-bandwidth usage needs. When the prober 406 receives a probe response indicative of the existence of a critical application 156, the prober 406 generates a multi-fabric load balancing event that is detectable by the load balancing detector 404 to initiate dynamic multi-fabric load balancing. In the illustrated example, a probe response indicative of the existence of a critical application 156 also includes a duration value of "interval_in_seconds" that identifies the duration for which the critical application 156 needs exclusive use of a network fabric. Example telematics techniques that may be used to implement the prober 406 are described below in connection with FIG. 5.

The example API 408 generates multi-fabric load balancing events based on receiving API calls from critical applications 156 executing in VMs (e.g., the VM 114 of FIG. 1A). For example, a counterpart API corresponding to the API 408 may be provided as part of a guest OS executing on the VM 114. When an application 118 of the VM 114 becomes a critical application 156, the critical application 156 generates an API call indicative of its critical application status to request exclusive network fabric use, and the API call is received by the API 408. The example API 408 then generates a multi-fabric load balancing event that is detectable by the load balancing detector 404 to initiate dynamic multi-fabric load balancing. In the illustrated example, the example API 408 is defined as: "int request_critical_fabric (int interval_in_seconds)." In this example, an API call via the API 408 is indicative of the existence of a critical application that requires high-bandwidth usage for a time limit or duration specified in terms of seconds by the variable value "interval_in_seconds." In other examples, other units of time may be used instead. The example specified duration "interval_in_seconds" identifies the duration or time limit for which the critical application 156 needs exclusive use of a network fabric, after which time the exclusively assigned network fabric can again be assigned to non-critical applications 154.

In the illustrated example of FIG. 4, to track the duration specified in the variable "interval_in_seconds," the fabric assignment manager 152 is provided with an example timer 410. In the illustrated example, upon receiving the duration value of "interval_in_seconds" in connection with telematics-based monitoring or an API call, the network fabric configurator 402 loads the duration value in the timer 410, and it starts the timer 410 when the critical application 156 is assigned exclusive use of a network fabric. When the network fabric configurator 402 detects that the timer 410 has expired, the network fabric configurator 402 determines that the critical application 156 has become a non-critical application 154, and performs dynamic multi-fabric load balancing to assign all available network fabrics (e.g., the first and second network fabrics 144, 146) for non-exclusive use to the non-critical applications 154.

FIG. 5 is an example telematics implementation that may be used to implement the example prober 406 of FIG. 4 to determine the existence of critical applications 156 (FIG. 1C) for which dynamic multi-fabric load balancing should be performed by the example fabric assignment manager 152 (FIGS. 1A-1C, 3, and 4). In the illustrated example, the prober 406 is in communication with multiple telematics agents 502a-c running in guest OSs 504, 506, 508 executing on corresponding VMs 114, 510, 512. In the illustrated example, the telematics agents 502a-c are provided as add-on modules installable and executable on the guest OSs 504, 506, 508 to collect information from the different guest OSs 504, 506, 508 regarding non-critical applications 154 and/or critical applications 156 that are running and provide the information to the prober 406. In the illustrated example, the telematics agents 502a-c run while providing little or no interference with the operations of the OSs 504, 506, 508. For example, the telematics agents 502a-c may be implemented as a set of Access Control List (ACL) rules that operate as data collection rules to capture signatures of events that are happening in the OSs 504, 506, 508. Such data collection rules can include static rules and/or dynamic rules. Example data collection rules can be used to collect any information that could be indicative of the existence of a critical application including statistics for various packet flows, starts of VM migrations (e.g., user triggered and/or DRS-triggered), starts of virtualized storage area network rebalancing, starts of host evacuation, starts of host upgrades, virtual extensible local area network (VXLAN) flow statistics, quality of service (QoS) statistics, maximum transmission unit (MTU) configurations, routing changes, etc. The example telematics agents 502a-c also collect identifiers of applications 118 corresponding to such collected information to identify whether any of the applications 118 are critical applications 156 based on such collected data. The example telematics engines 502a-c collect such information periodically and send the telematics-collected information to the example prober 406 as probe responses in response to probe requests received from the prober 406. The example prober 406 analyzes the probe responses to identify the existence of critical applications 156. In the illustrated example, the prober 406 sends probe request messages to the different VMs 114, 510, 512 using corresponding destination addresses (e.g., internet protocol (IP) addresses, media access control (MAC) addresses, etc.).

In some examples, means for configuring network assignments is implemented by the network fabric configurator 402 of FIG. 4. In some examples, means for determining to reassign network fabrics is implemented by the load balancing detector 404 of FIG. 4. In some examples, means for probing is implemented by the prober 406 of FIG. 4. In some examples, means for receiving API calls is implemented by the API 408. In some examples, means for timing is implemented by the timer 410 of FIG. 4.

While an example manner of implementing the fabric assignment manager 152 of FIGS. 1A-1C and 3 is illustrated in FIG. 4, one or more of the elements, processes and/or devices illustrated in FIG. 4 may be combined, divided, re-arranged, omitted, eliminated and/or implemented in any other way. Further, the example network fabric configurator 402, the example load balancing detector 404, the example prober 406, the example API 408, the example timer 410, and/or, more generally, the example fabric assignment manager 152 of FIGS. 1A-1C and 3 may be implemented by hardware, software, firmware and/or any combination of hardware, software and/or firmware. Thus, for example, any of the example network fabric configurator 402, the example load balancing detector 404, the example prober 406, the example API 408, the example timer 410 and/or, more generally, the example fabric assignment manager 152 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network fabric configurator 402, the example load balancing detector 404, the example prober 406, the example API 408, and/or the example timer 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fabric assignment manager 152 of FIGS. 1A-1C and 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
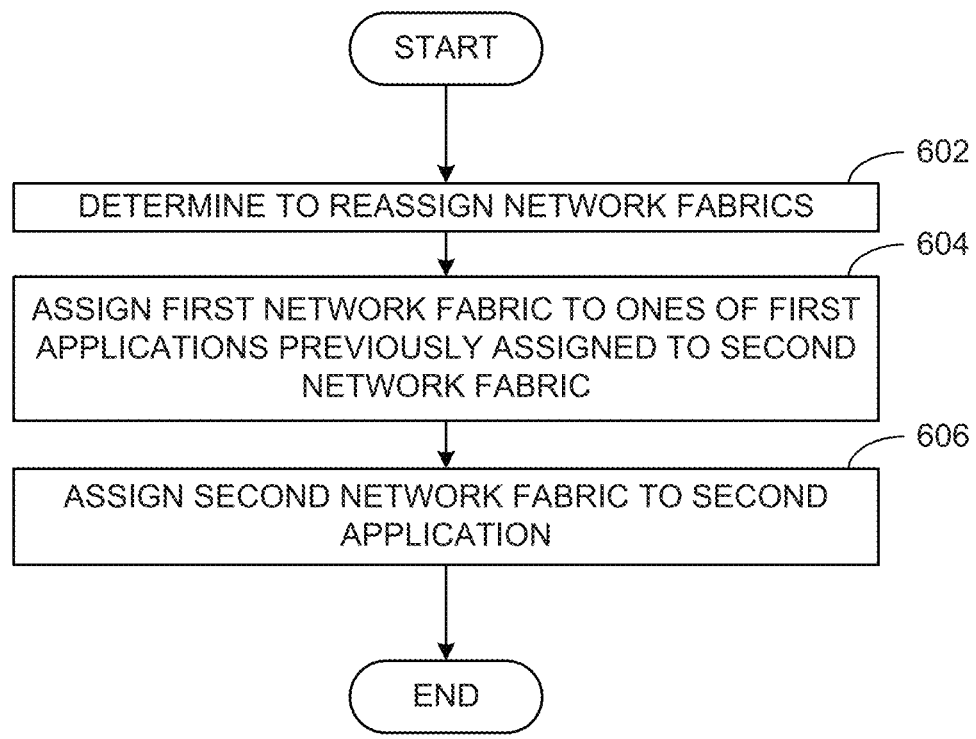
FIG. 6 is a flowchart representative of example machine-readable instructions that may be executed to implement the example fabric assignment manager of FIGS. 1A-1C, 3, and 4 to perform dynamic multi-fabric load balancing in the multi-fabric network of FIGS. 1A-1C.
Figure 7:
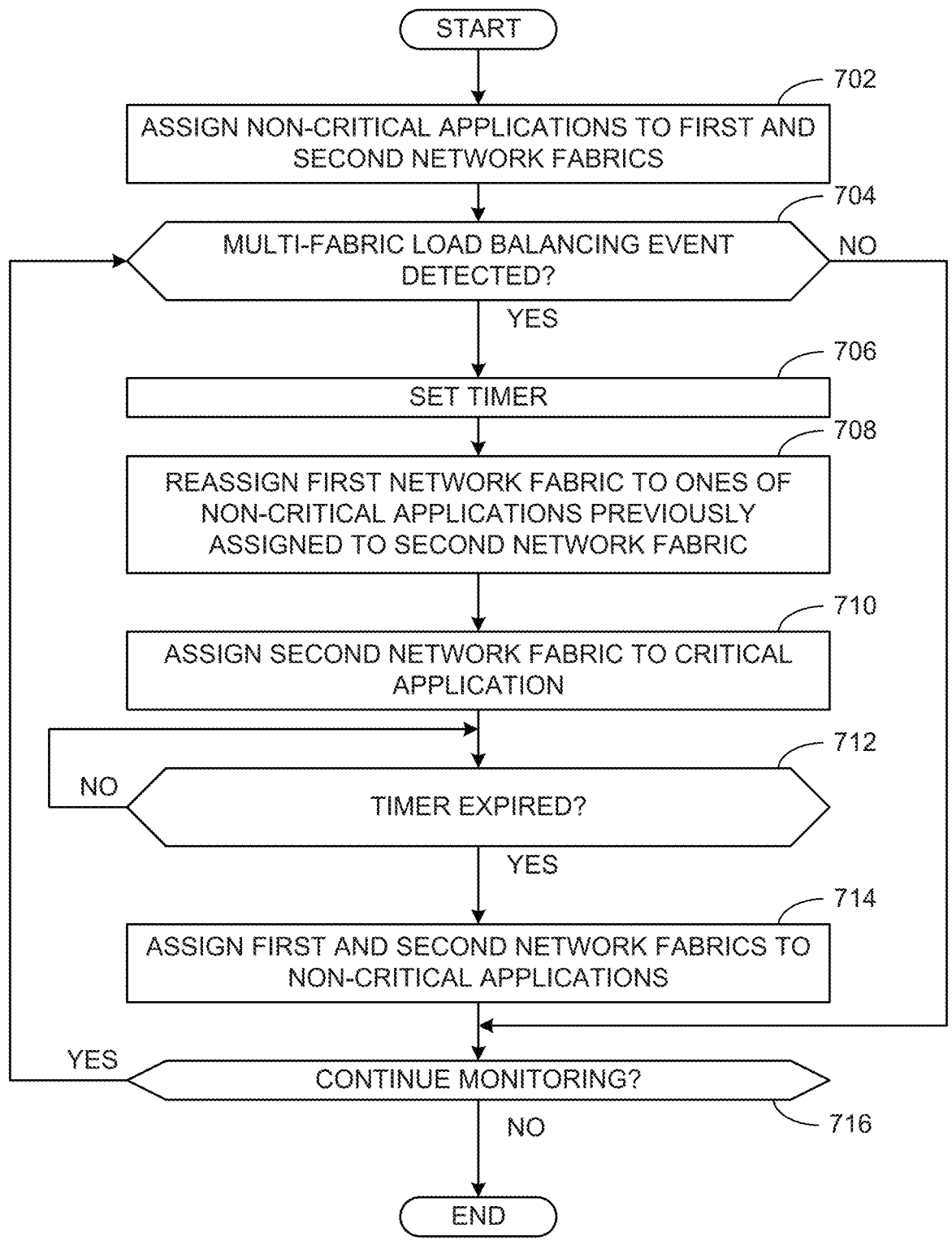
FIG. 7 is another flowchart representative of machine-readable instructions that may be executed to implement the example fabric assignment manager of FIGS. 1A-1C, 3, and 4 to perform dynamic multi-fabric load balancing in the multi-fabric network of FIGS. 1A-1C.

Flowcharts representative of example hardware logic or machine-readable instructions for implementing the fabric assignment manager 152 of FIGS. 1A-1C, 3, and 4 are shown in FIGS. 6 and 7. The machine-readable instructions may be one or more programs or portions of one or more programs for execution by a processor such as the processor 912 shown in the example processor platform 900 discussed below in connection with FIG. 9. The programs may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6 and 7, many other methods of implementing the example fabric assignment manager 152 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 6 is a flowchart representative of example machine-readable instructions that may be executed to implement the example fabric assignment manager 152 of FIGS. 1A-1C, 3, and 4 to perform dynamic multi-fabric load balancing in the multi-fabric network of FIGS. 1A-1C. The example process of FIG. 6 begins at block 602 at which the load balancing detector 404 (FIG. 4) determines to reassign network fabrics. For example, the load balancing detector 404 may determine to reassign the first and second network fabrics 144, 146 between non-critical applications 154 (e.g., first applications) previously assigned to the first and second network fabrics 144, 146 and a critical application 156 (e.g., a second application). In the illustrated example, the load balancing detector 404 may determine to perform such a reassigning of network fabrics based on detecting a multi-fabric load balancing event generated by the prober 406 and/or the API 408 of FIG. 4. The example network fabric configurator 402 (FIG. 4) reassigns the first network fabric 144 to ones of the non-critical applications 154 previously assigned to the second network fabric 146 (block 604). For example, the network fabric configurator 402 configures the VDS 116 to assign the first network fabric 144 to the non-critical applications 154. The example network fabric configurator 402 also assigns the second network fabric 146 to the critical application 156 (block 606). For example, the network fabric configurator 402 configures the VDS 116 to assign the second network fabric 146 to the critical application 156. In the illustrated example, the network fabric configurator 402 performs the operations of block 604 and 606 in response to the load balancing detector 404 detecting to reassign the first and second network fabrics 144, 146. In this manner, the critical application 156 is provided with exclusive use of the second network fabric 146 to service its high-bandwidth network usage needs. The example process of FIG. 6 ends.

FIG. 7 is another flowchart representative of machine-readable instructions that may be executed to implement the example fabric assignment manager 152 of FIGS. 1A-1C, 3, and 4 to perform dynamic multi-fabric load balancing in the multi-fabric network of FIGS. 1A-1C. The example process of FIG. 7 begins at block 702 at which the example network fabric configurator 402 (FIG. 4) assigns the non-critical applications 154 to the first and second network fabrics 144, 146. For example, the network fabric configurator 402 configures the VDS 116 (FIG. 1A) to assign the non-critical applications 154 to the first and second network fabrics 144, 146. The example load balancing detector 404 (FIG. 4) determines whether a multi-fabric load balancing event has been detected (block 704). In the illustrated example, the load balancing detector 404 may detect a multi-fabric load balancing event when such an event is generated by the prober 406 based on a received probe response indicative of current or imminent high bandwidth usage corresponding to the critical application 156. Additionally or alternatively, the load balancing detector 404 may detect a multi-fabric load balancing event when such an event is generated by the API 408 of FIG. 4 when an API call is received by the API 408 indicative of a request for exclusive network fabric use by the critical application 156. When the load balancing detector 404 determines at block 704 that a multi-fabric load balancing event has not been detected, control advances to block 716. When the load balancing detector 404 determines at block 704 that a multi-fabric load balancing event has been detected, the network fabric configurator 402 sets the example timer 410 (FIG. 4) (block 706). For example, the network fabric configurator 402 sets the timer 410 by loading a duration value from the variable "interval_in_seconds" received by the prober 406 in a probe response and/or received by the API 408 in an API call from the critical application 156.

The example network fabric configurator 402 reassigns the first network fabric 144 to ones of the non-critical applications 154 previously assigned to the second network fabric 146 (block 708). For example, the network fabric configurator 402 configures the VDS 116 to assign the first network fabric 144 to the non-critical applications 154. The example network fabric configurator 402 also assigns the second network fabric 146 to the critical application 156 (block 710). For example, the network fabric configurator 402 configures the VDS 116 to assign the second network fabric 146 to the critical application 156. In the illustrated example, the network fabric configurator 402 performs the operations of block 708 and 710 in response to the load balancing detector 404 detecting to reassign the first and second network fabrics 144, 146. In this manner, the critical application 156 is provided with exclusive use of the second network fabric 146 to service its high-bandwidth network usage needs.

The example network fabric configurator 402 determines whether the timer 410 has expired (block 712). For example, the network fabric configurator 402 may poll the timer or check for a 'timer expiration' event generated by the timer 410. When the network fabric configurator 402 determines at block 712 that the timer 410 has expired, the network fabric configurator 402 assigns the first and second network fabrics 144, 146 to the non-critical applications 154 (block 714). For example, the network fabric configurator 402 configures the VDS 116 to assign the first and second network fabrics 144, 146 to the non-critical applications 154 such that the non-critical applications 154 are assigned across both of the first and second network fabrics 144, 146 without either of the first and second network fabrics 144, 146 being reserved for exclusive use by any application. At block 716, the load balancing detector 404 determines whether it should continue to monitor for multi-fabric load balancing events. If the load balancing detector 404 is to continue monitoring for multi-fabric load balancing events, control returns to block 704. Otherwise, the example process of FIG. 7 ends.

Figure 8:
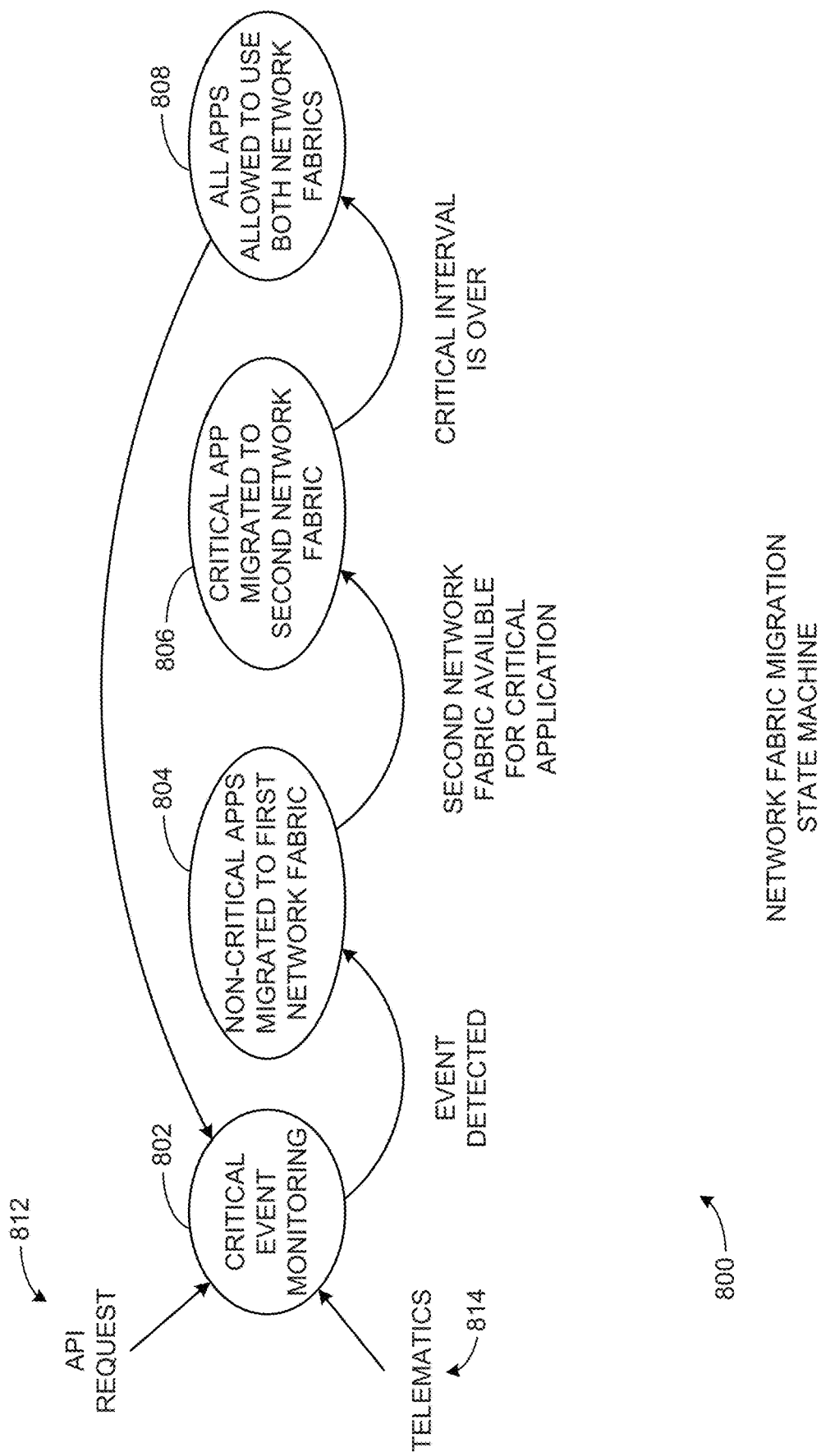
FIG. 8 is an example network fabric migration state machine representative of different states of the virtual network distributed switch of FIGS. 1A, 3, and 5 that may be configured by the fabric assignment manager of FIGS. 1A-1C, 3, and 4 to perform dynamic multi-fabric load balancing in the multi-fabric network of FIGS. 1A-1C.

FIG. 8 is an example network fabric migration state machine 800 representative of different states of the VDS 116 of FIG. 1C that may be configured by the fabric assignment manager 152 of FIGS. 1A-1C, 3, and 4 to perform dynamic multi-fabric load balancing. The states of the example network fabric migration state machine 800 are representative of different logic circuit configurations of the example fabric assignment manager 152 and/or the VDS 116 to perform dynamic multi-fabric load balancing using the first and second network fabrics 144, 146 (FIGS. 1A-1C). The example 'network fabric migration state machine 800 includes an example 'critical event monitoring' state 802, an example 'non-critical application migrated to first network fabric' state 804, an example 'critical application migrated to second network fabric' state 806, and an example 'all applications allowed to use both network fabrics state 808. In the example 'critical event monitoring' state 802, the load balancing detector 404 (FIG. 4) awaits detection of a multi-fabric load balancing event. For example, the multi-fabric load balancing event may be generated by the API 408 (FIG. 4) based on an example API request 812 sent by a critical application 156 (FIG. 1C) requesting exclusive network fabric use. Additionally or alternatively, the multi-fabric load balancing event may be generated with telematics 814 using the prober 406 (FIG. 4). For example, the prober 406 may receive a probe response sent by a telematics agent 502*a*-*c* (FIG. 5) indicative of current or imminent high bandwidth usage corresponding to the critical application 156.

When a multi-fabric load balancing event is detected, the example network fabric migration state machine 800 transitions to the 'non-critical application migrated to first network fabric' state 804 at which the first network fabric 144 is assigned to all of the non-critical applications 154. For example, the network fabric configurator 402 (FIG. 4) assigns the first network fabric 144 to ones of the non-critical applications 154 previously assigned to the second network fabric 146. When the second network fabric 146 is freed, it is available for the critical application 156, and the example network fabric migration state machine 800 transitions to the 'critical application migrated to second network fabric' state 806 at which the second network fabric 146 is assigned exclusively to the critical application 156. After a critical interval is over (e.g., a duration identified in the variable "interval_in_seconds" has expired), the example network fabric migration state machine 800 transitions to the 'all applications allowed to use both network fabrics state 808 at which the first and second network fabrics 144, 146 are again available to be assigned to any non-critical application 154 without either of the first and second network fabrics 144, 146 being exclusively reserved for use by any single application. The example network fabric migration state machine 800 then transitions back to the 'critical event monitoring' state 802.

Figure 9:
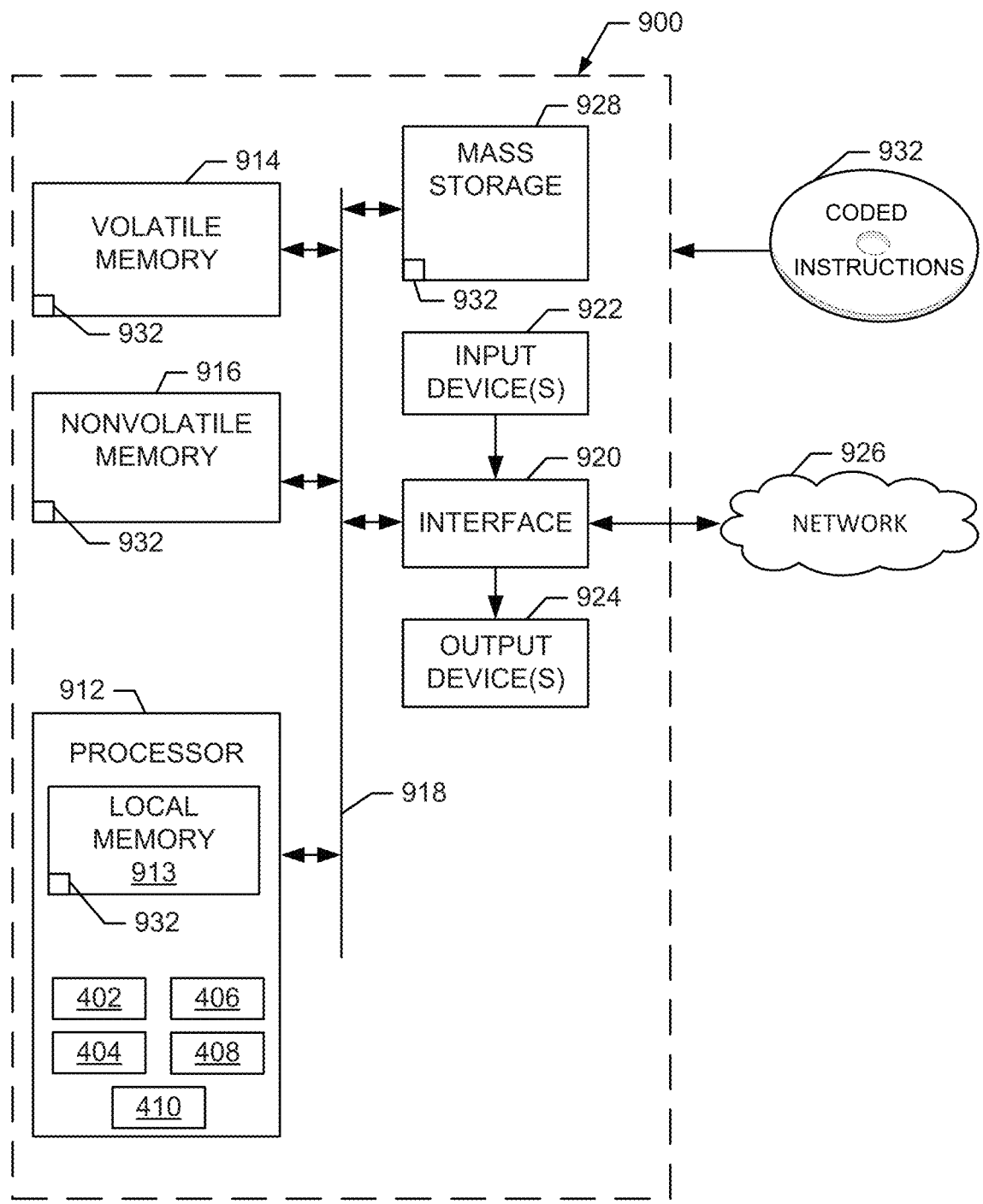
FIG. 9 is a block diagram of an example processor platform structured to execute the machine-readable instructions represented in FIGS. 7 and 8 to implement the fabric assignment manager of FIGS. 1A-1C, 3, and 4 to perform dynamic multi-fabric load balancing in the multi-fabric network of FIGS. 1A-1C.

FIG. 9 is a block diagram of an example processor platform 900 structured to execute the instructions of FIGS. 6 and 7 and/or to implement the logic circuit configurations represented by the example network fabric migration state machine 800 of FIG. 8 to implement the fabric assignment manager 152 of FIGS. 1A-1C, 3, and 4. The processor platform 900 can be, for example, a server, a personal computer, a workstation, a self-learning machine (e.g., a neural network), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the network fabric configurator 402, the load balancing detector 404, the prober 406, the API 408, and the timer 410 of FIG. 4.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Example machine executable instructions 932 representative of the machine-readable instructions of FIGS. 6 and 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed to perform dynamic multi-fabric load balancing to increase availability and throughput of network resources for critical applications in need of high-bandwidth usage. Examples disclosed herein enable more efficient use of multi-fabric environments by allowing all applications running on a host to use any network fabric without reserving any one of the network fabrics for use by a critical application when such a critical application does not exist. In this manner, instead of having a network fabric on continuous reserve and allowing it to sit idly when it is not needed by a critical application, all network fabrics are used by non-critical applications. Only when a critical application having a high-bandwidth usage need is detected, do examples disclosed herein release a network fabric from non-critical applications to accommodate an exclusive use of the freed network fabric by the critical application. This decreases the costs associated with configuring physical rack systems by not needing to provide additional switches to accommodate reserving permanent network fabrics for exclusive use of critical applications. In addition, examples disclosed herein increase the available bandwidth for use by non-critical applications by allowing all network fabrics to be assignable to any non-critical application when a critical application does not exist. By load balancing non-critical applications across all available network fabrics, network throughput performance for those non-critical applications can be improved when critical applications do not exist.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage network resources, the method comprising:
   determining to reassign first and second network fabrics; and
   in response to the determining to reassign the first and second network fabrics, configuring a virtual network distributed switch to:
      assign the first network fabric to ones of first applications previously assigned to the second network fabric; and
      assign the second network fabric for exclusive use by a second application for a duration by assigning first and second distributed virtual ports of the virtual network distributed switch to the second application, the first and second distributed virtual ports corresponding to first and second network links forming the second network fabric.

2. The method as defined in claim 1, wherein the determining to reassign the first and second network fabrics is based on a multi-fabric load balancing event indicative of high-bandwidth usage corresponding to the second application.

3. The method as defined in claim 1, further including receiving an application programming interface call requesting exclusive network fabric use, and the determining to reassign the first and second network fabrics is based on the application programming interface call.

4. The method as defined in claim 3, wherein the application programming interface call indicates the duration for the exclusive network fabric use.

5. The method as defined in claim 1, further including receiving a probe response indicative of high-bandwidth usage corresponding to the second application, and the determining to reassign the first and second network fabrics is based on the high-bandwidth usage of the second application.

6. The method as defined in claim 1, further including assigning at least some of the first applications to the second network fabric when the second application is finished using the second network fabric.

7. The method as defined in claim 1, wherein the first applications are to communicate via the first network fabric using a first link aggregation group, and the second application is to communicate via the second network fabric using a second link aggregation group.

8. An apparatus to manage network resources, the apparatus comprising:
   a load balancing detector structured to determine to reassign first and second network fabrics; and
   a network fabric configurator structured to, in response to the determining to reassign the first and second network fabrics, configure a virtual network distributed switch to:
      assign the first network fabric to ones of first applications previously assigned to the second network fabric;
      assign the second network fabric for exclusive use by a second application for a duration by assigning first and second distributed virtual ports of the virtual network distributed switch to the second application, the first and second distributed virtual ports corresponding to first and second network links forming the second network fabric; and
      assign the second network fabric to at least some of the first applications in response to a timer indicating that the duration has expired, at least one of the load balancing detector or the network fabric configurator including a logic circuit.

9. The apparatus as defined in claim 8, wherein the load balancing detector is to determine to reassign the first and second network fabrics based on a multi-fabric load balancing event indicative of high-bandwidth usage corresponding to the second application.

10. The apparatus as defined in claim 8, further including an application programming interface structured to receive a request for exclusive network fabric use, the load balancing detector to determine to reassign the first and second network fabrics based on the request received by the application programming interface.

11. The apparatus as defined in claim 10, wherein the request indicates the duration for the exclusive network fabric use.

12. The apparatus as defined in claim 8, further including a prober structured to receive a probe response indicative of high-bandwidth usage corresponding to the second application, the load balancing detector to determine to reassign the first and second network fabrics based on the high-bandwidth usage of the second application.

13. The apparatus as defined in claim 8, wherein the network fabric configurator is further to assign at least some of the first applications to the second network fabric when the second application is finished using the second network fabric.

14. The apparatus as defined in claim 8, wherein the first applications are to communicate via the first network fabric using a first link aggregation group, and the second application is to communicate via the second network fabric using a second link aggregation group.

15. An apparatus to manage network resources, the apparatus comprising:
   means for determining to reassign first and second network fabrics; and
   means for configuring network fabric assignments in response to the determining to reassign the first and second network fabrics by:
      assigning the first network fabric to ones of first applications previously assigned to the second network fabric;
      assigning the second network fabric for exclusive use by a second application for a duration by assigning first and second distributed virtual ports of a virtual network distributed switch to the second application, the first and second distributed virtual ports corresponding to first and second network links forming the second network fabric; and
      assigning the second network fabric to at least some of the first applications in response to expiration of the duration.

16. The apparatus as defined in claim 15, wherein the means for determining is to determine to reassign the first and second network fabrics based on a multi-fabric load balancing event indicative of high-bandwidth usage corresponding to the second application.

17. The apparatus as defined in claim 15, further including means for receiving an application programming interface call requesting exclusive network fabric use, the means for determining to reassign to determine to reassign the first and second network fabrics based on the application programming interface call.

18. The apparatus as defined in claim 17, wherein the application programming interface call indicates the duration for the exclusive network fabric use, the means for configuring to assign the second network fabric for the exclusive use by the second application based on the duration from the application programming interface call.

19. The apparatus as defined in claim 15, further including means for receiving a probe response indicative of high-bandwidth usage corresponding to the second application, the means for determining to determine to reassign the first and second network fabrics based on the high-bandwidth usage of the second application.

20. The apparatus as defined in claim 15, wherein the means for configuring is further to assign at least some of the first applications to the second network fabric when the second application is finished using the second network fabric.

21. The apparatus as defined in claim 15, wherein the first applications are to communicate via the first network fabric using a first link aggregation group, and the second application is to communicate via the second network fabric using a second link aggregation group.

22. A non-transitory computer readable storage medium comprising instructions that, when executed, cause at least one processor to at least:
   determine to reassign first and second network fabrics; and
   in response to the determining to reassign the first and second network fabrics, configure a virtual network distributed switch to:
      assign the first network fabric to ones of first applications previously assigned to the second network fabric;
      assign the second network fabric for exclusive use by a second application for a duration by assigning first and second distributed virtual ports of the virtual network distributed switch to the second application, the first and second distributed virtual ports corresponding to first and second network links forming the second network fabric; and
      assign the second network fabric to at least some of the first applications in response to expiration of the duration.

23. The non-transitory computer readable storage medium as defined in claim 22, wherein the instructions are to cause the at least one processor to determine to reassign the first and second network fabrics based on a multi-fabric load balancing event indicative of high-bandwidth usage corresponding to the second application.

24. The non-transitory computer readable storage medium as defined in claim 22, wherein the instructions are further to cause the at least one processor to receive an application programming interface call requesting exclusive network fabric use, and to determine to reassign the first and second network fabrics based on the application programming interface call.

25. The non-transitory computer readable storage medium as defined in claim 24, wherein the application programming interface call indicates the duration for the exclusive network fabric use.

26. The non-transitory computer readable storage medium as defined in claim 22, wherein the instructions are further to cause the at least one processor to receive a probe response indicative of high-bandwidth usage corresponding to the second application, and to determine to reassign the first and second network fabrics based on the high-bandwidth usage of the second application.

27. The non-transitory computer readable storage medium as defined in claim 22, wherein the instructions are further to cause the at least one processor to assign at least some of the first applications to the second network fabric when the second application is finished using the second network fabric.

28. The non-transitory computer readable storage medium as defined in claim 22, wherein the first applications are to communicate via the first network fabric using a first link aggregation group, and the second application is to communicate via the second network fabric using a second link aggregation group.

* * * * *